US012659840B2

(12) United States Patent
Jose

(10) Patent No.: US 12,659,840 B2
(45) Date of Patent: Jun. 16, 2026

(54) IDENTIFYING SUPPORT OF REDUCED CAPABILITY IN MOBILE COMMUNICATIONS

(71) Applicant: MediaTek Singapore Pte. Ltd., Singapore (SG)

(72) Inventor: Pradeep Jose, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 441 days.

(21) Appl. No.: 18/019,094

(22) PCT Filed: Jul. 26, 2021

(86) PCT No.: PCT/CN2021/108357
§ 371 (c)(1),
(2) Date: Jan. 31, 2023

(87) PCT Pub. No.: WO2022/028263
PCT Pub. Date: Feb. 10, 2022

(65) Prior Publication Data
US 2023/0300723 A1      Sep. 21, 2023

Related U.S. Application Data

(60) Provisional application No. 63/061,212, filed on Aug. 5, 2020.

(51) Int. Cl.
*H04W 48/10*            (2009.01)

(52) U.S. Cl.
CPC .................................... *H04W 48/10* (2013.01)

(58) Field of Classification Search
CPC ...................................................... H04W 48/10

USPC .......................................................... 455/434
See application file for complete search history.

(56) References Cited

U.S. PATENT DOCUMENTS

| | | | |
|---|---|---|---|
| 2013/0100895 A1 | 4/2013 | Aghili et al. | |
| 2013/0322370 A1 | 12/2013 | Fong et al. | |
| 2017/0223723 A1 | 8/2017 | Das et al. | |
| 2020/0187189 A1* | 6/2020 | Raghunathan | ........ H04W 72/51 |
| 2023/0180110 A1* | 6/2023 | Kim | ...................... H04W 48/02 |
| | | | 370/329 |

(Continued)

FOREIGN PATENT DOCUMENTS

| | | |
|---|---|---|
| CN | 110536486 A | 12/2019 |
| CN | 111345072 A | 6/2020 |

(Continued)

OTHER PUBLICATIONS

European Patent Office, Extended European Search Report in European Patent Application No. 21852815.6 01215, Jul. 10, 2024.

(Continued)

*Primary Examiner* — Qutbuddin Ghulamali
(74) *Attorney, Agent, or Firm* — Andy M. Han; Han IP PLLC

(57) ABSTRACT

Various solutions for identifying support of a reduced capability in mobile communications are described. An apparatus, implementable in a user equipment (UE), receives from a network an indication of support of a reduced capability. The apparatus then communicates with the network using the reduced capability, including transmitting to the network an identifier that identifies the UE as a reduced-capability UE.

15 Claims, 4 Drawing Sheets

(56)                    References Cited

U.S. PATENT DOCUMENTS

2024/0284273 A1 *    8/2024   Xie ...................... H04W 48/16

FOREIGN PATENT DOCUMENTS

WO      WO 2013139023 A1      9/2013
WO      WO 2015110228 A1      7/2015
WO      WO 2015169387 A1     11/2015

OTHER PUBLICATIONS

China National Intellectual Property Administration, 1st Office Action in China Patent Application No. 202180059497.2, Jun. 25, 2025.

Huawei et al: "Other aspects for reduced capability devices", 3GPP TSG RAN WG1 Meeting #101-e, R1-2004612, May 25-Jun. 5, 2020.

Qualcomm: "Considerations for Standardization Framework and Design Principles of RedCap Devices", 3GPP TSG RAN WG1, R1-2004496, e-Meeting, May 25-Jun. 5, 2020.

* cited by examiner

100

WIRELESS NETWORK
120

125

110

- IDENTIFY SUPPORT OF A REDUCED CAPABILITY
- COMMUNICATE USING THE REDUCED CAPABILITY

300

RECEIVE FROM A NETWORK AN INDICATION OF SUPPORT OF A
REDUCED CAPABILITY
310

COMMUNICATE WITH THE NETWORK USING THE REDUCED
CAPABILITY
320

TRANSMIT TO A NETWORK AN IDENTIFIER THAT IDENTIFIES A
USER EQUIPMENT (UE) AS A REDUCED-CAPABILITY UE
410

COMMUNICATE WITH THE NETWORK USING A REDUCED
CAPABILITY
420

IDENTIFYING SUPPORT OF REDUCED CAPABILITY IN MOBILE COMMUNICATIONS

CROSS REFERENCE TO RELATED APPLICATIONS

The present disclosure is part of U.S. National Stage filing of International Patent Application No. PCT/CN2021/108357, filed 26 Jul. 2021, which is part of a non-provisional application claiming the priority benefit of U.S. Patent Application Nos. 63/061,212, filed on 5 Aug. 2020, the content of which being incorporated by reference in its entirety.

FIELD OF THE INVENTION

The present disclosure is generally related to mobile communications and, more particularly, to identifying support of a reduced capability in mobile communications.

BACKGROUND OF THE INVENTION

Unless otherwise indicated herein, approaches described in this section are not prior art to the claims listed below and are not admitted as prior art by inclusion in this section.

In wireless communications, such as mobile communications under the 3rd Generation Partnership Project (3GPP) specification(s) for 5th Generation (5G) New Radio (NR), certain existing NR networks are deployed with the assumption that the minimum requirements as defined for a Release 15 (Rel-15) user equipment (UE) device are supported by all UEs that operate in the network. Such minimum requirements include, but are not limited to, a UE's operating bandwidth being at least 100 MHz and the minimum supported number of receiving (Rx) antennas at the UE being 2 or 4. However, the introduction of reduced capability changes the mandatory minimum requirements of an NR UE operating in a network. As such, it is expected that more and more UE devices may be deployed with one or more reduced capabilities such as, for example, the UE's operating bandwidth being 20 MHz, the minimum supported number of Rx antennas at the UE being 1 (or 2), and operating with half duplex (instead of full duplex) frequency-division duplexing (FDD). Consequently, only a limited number of base stations in a network having been updated to support such reduced minimum capabilities would be able to support reduced-capability (RedCap) UEs. Therefore, there is a need for a solution to enable identifying support of reduced-capability operations in mobile communications.

SUMMARY OF THE INVENTION

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions for identifying support of a reduced capability in mobile communications.

In one aspect, a method may involve receiving from a network an indication of support of a reduced capability. The method may also involve communicating with the network using the reduced capability.

In another aspect, a method may involve transmitting to a network an identifier that identifies a UE as a reduced-capability UE. The method may also involve communicating with the network using a reduced capability.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Narrow Band Internet of Things (NB-IoT), Industrial Internet of Things (IIoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to identifying support of a reduced capability in mobile communications. According to the present disclosure, a number of possible solutions may be implemented separately or jointly. That is, although these possible solutions may be described below separately, two or more of these possible solutions may be implemented in one combination or another.

Figure 1:
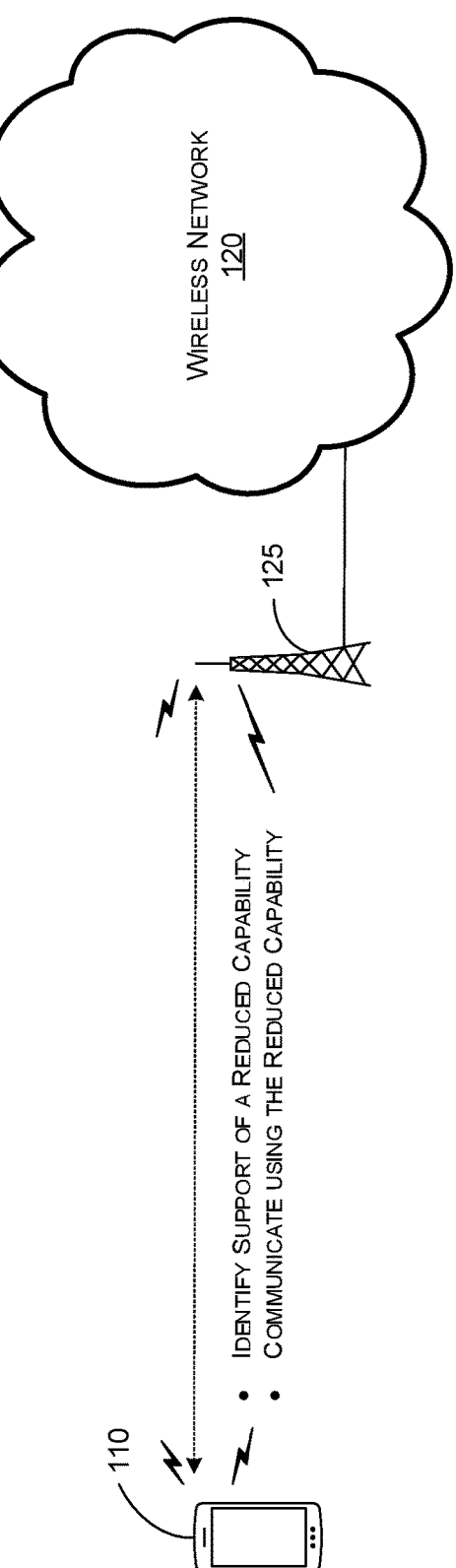
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network or another type of network such as an NTN). UE 110 may be in wireless communication with wireless network 120 via a base station or network node 125 (e.g., an eNB, gNB or transmit-receive point (TRP)). In network environment 100, UE 110 and wireless network 120 (via network node 125) may implement various schemes pertaining to identifying support of a reduced capability in mobile communications, as described below.

Under a proposed scheme in accordance with the present disclosure, one way to define or otherwise identify a RedCap device type is to associate a set of RedCap features that reduce mandatory minimum required capabilities of a legacy NR device with an identifier. For instance, a new identifier RedCap-UE may be utilized to associate an UE (e.g., UE 110) with one or more reduced capabilities including, for example and without limitations, (1) UE bandwidth=minimum value defined for RedCap (e.g., 20 MHz); (2) number of Rx antennas=minimum value defined for a band for RedCap (e.g., 1 or 2); (3) half duplex FDD operation; and (4) any other feature(s) that may change the mandatory minimum capabilities of a legacy NR UE.

Under the proposed scheme, UE 110 may identify itself to network 120 as being of the RedCap type by signaling the identifier RedCap-UE to network node 125. For instance, the identifier RedCap-UE may be included in the UECapabilityInformation message, which may be a standalone message exchanged between UE 110 and network node 125 after establishing a connection therebetween. Alternatively, or additionally, the identifier RedCap-UE may be transmitted by UE 110 during an initial access procedure (e.g., a random access procedure) such as in Message 3 (Msg3), Message A (MsgA) and/or Message 5 (Msg5) in a 2-step or 4-step random access procedure. For instance, the identifier RedCap-UE may be included in any of the following radio resource control (RRC) messages: RRCSetupRequest (e.g., in Msg3), RRCSetupComplete (e.g., in Msg5), RRCResumeRequest (e.g., in Msg3) or RRCResumeComplete (e.g., in Msg5). Moreover, the identifier RedCap-UE may be included as a medium access control (MAC) control element (CE) in Msg3 or Msg5.

Under another proposed scheme in accordance with the present disclosure, network 120 may indicate to UE 110 that network 120 supports RedCap operation(s) using broadcast information. Under the proposed scheme, the broadcast information may indicate one or more of the following: (1) whether a specific cell supports RedCap operation; (2) whether a specific frequency (e.g., any or all cells on this frequency) supports RedCap operation; and (3) whether one or more neighboring cells support RedCap operation.

Under the proposed scheme, in broadcasting whether a specific cell supports RedCap operation, network node 125 may use System Information Block 1 (SIB1) to indicate cell-level support of RedCap operation. For instance, a presence of a redCapAllowed field in SIB1 may indicate that the cell supports RedCap UEs, and an absence thereof may indicate that the cell does not support RedCap UEs.

Alternatively, or additionally, network node 125 may broadcast whether an entire frequency supports RedCap UEs by using SIB1. For instance, a presence of a redCapIntraFreqReselection field in SIB1 may indicate that all cells on this frequency support RedCap UEs, and an absence thereof may indicate that a UE cannot assume that all cells on this frequency support RedCap UEs.

Alternatively, or additionally, network node 125 may broadcast whether and which neighbor cell(s) support RedCap operation by using System Information Block 3 (SIB3) and/or System Information Block 4 (SIB4). For instance, a presence of a redCapIntraFreqBlackCellList field in SIB3 or a redCapInterFreqBlackCellList field in SIB4 may indicate a list of blacklisted intra-frequency or inter-frequency neighboring cells that do not support RedCap UEs. Moreover, a presence of a redCapIntraFreqNeighCellList field in SIB3 or a redCapInterFreqNeighCellList field in SIB4 may indicate a list of intra-frequency or inter-frequency neighboring cells that support RedCap UEs with specific cell re-selection parameters. Furthermore, a presence of a redCapIntraFreqWhiteCellList field in SIB3 or a redCapInterFreqWhiteCellList field in SIB4 may indicate a list of whitelisted intra-frequency or inter-frequency neighboring cells that support RedCap UEs.

Illustrative Implementations

Figure 2:
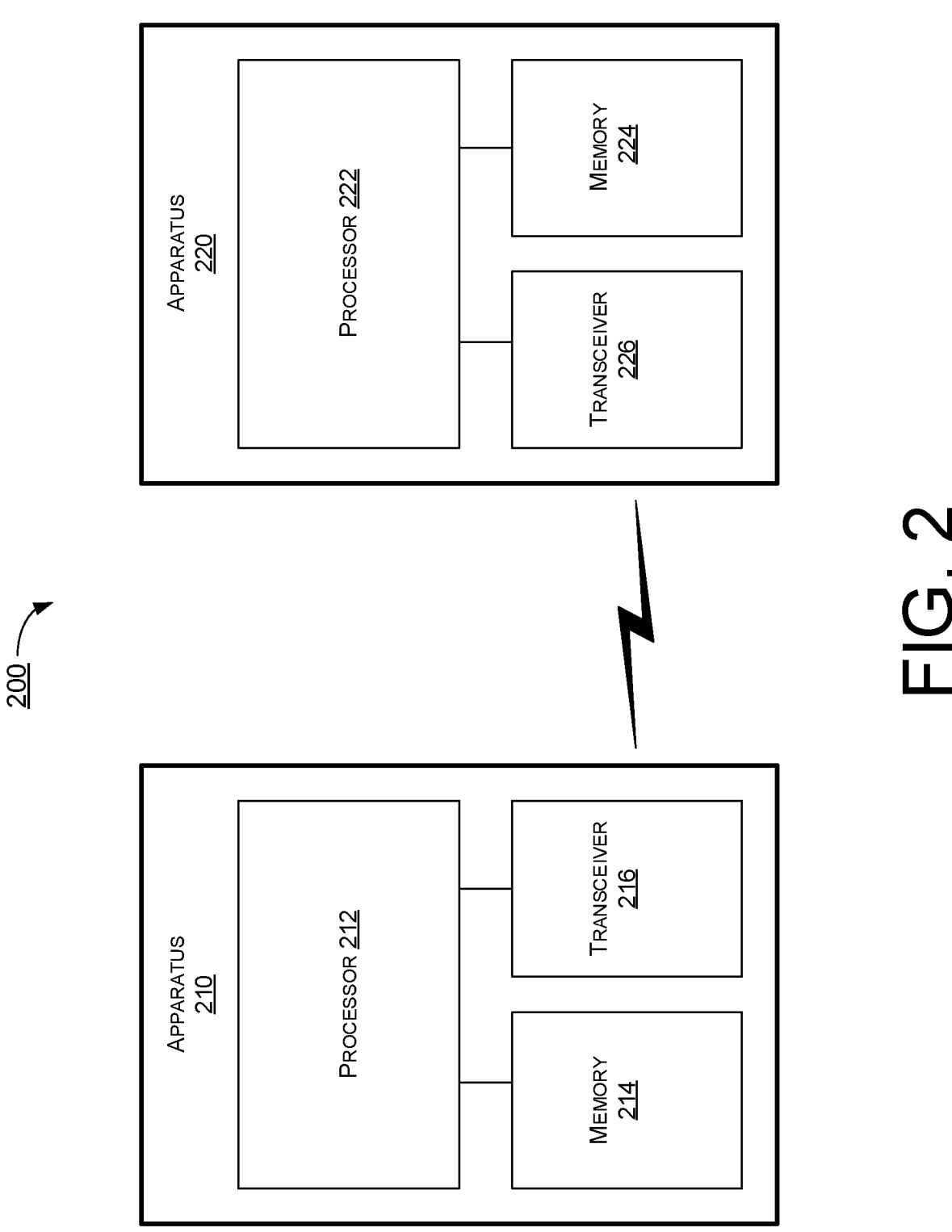
FIG. 2 is a block diagram of an example communication apparatus and an example network apparatus in accordance with an implementation of the present disclosure.

FIG. 2 illustrates an example communication system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to identifying support of a reduced capability in mobile communications, including the various schemes described above with respect to various proposed designs, concepts, schemes, systems and methods described above, including network environment 100, as well as processes described below.

Each of apparatus 210 and apparatus 220 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 210 and apparatus 220 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC or RISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to identifying support of a reduced capability in mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, transceiver 216 may be capable of wirelessly communicating with different types of wireless networks of different radio access technologies (RATs). In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 220 may also include a transceiver 226 coupled to processor 222. Transceiver 226 may include a transceiver capable of wirelessly transmitting and receiving data. In some implementations, transceiver 226 may be capable of wirelessly communicating with different types of UEs/wireless networks of different RATs. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (FeRAM), magnetoresistive RAM (MRAM) and/or phase-change memory.

Each of apparatus 210 and apparatus 220 may be a communication entity capable of communicating with each other using various proposed schemes in accordance with the present disclosure. For illustrative purposes and without limitation, a description of capabilities of apparatus 210, as a UE (e.g., UE 110), and apparatus 220, as a network node (e.g., network node 125) of a wireless network (e.g., network 120 as a 5G/NR mobile network), is provided below.

Under various proposed schemes in accordance with the present disclosure pertaining to identifying support of a reduced capability in mobile communications, processor 212 of apparatus 210 in a 5GS, implemented in or as UE 110, may receive, via transceiver 316, from a network (e.g., from network 120 via apparatus 220 as network node 125) an indication of support of a reduced capability. Moreover, processor 212 may communicate, via transceiver 316, with the network (e.g., via apparatus 220) using the reduced capability.

In some implementations, in receiving the indication, processor 212 may receive from a cell of the network a broadcast indicating support of an operation with the reduced capability by the cell. In such cases, in receiving the broadcast, processor 212 may receive the indication in a SIB in the broadcast.

In some implementations, in receiving the indication, processor 212 may receive from the network a broadcast indicating support of an operation with the reduced capability at a frequency by one or more cells of the network. In such cases, in receiving the broadcast, processor 212 may receive the indication in a SIB1 in the broadcast.

In some implementations, in receiving the indication, processor 212 may receive from a cell of the network a broadcast indicating support of an operation with the reduced capability by a neighboring cell of the network. In such cases, in receiving the broadcast, processor 212 may receive the indication in a SIB3 or a SIB4 in the broadcast.

In some implementations, the reduced capability may include one or more of a bandwidth used by UE 110, a number of receiving antennas at UE 110, and a half duplex FDD operation.

In some implementations, processor 212 may perform additional operations. For instance, processor 212 may transmit, via transceiver 316, to the network (e.g., via apparatus 220) an identifier that identifies UE 110 as a reduced-capability UE.

In some implementations, in transmitting the identifier, processor 212 may identify UE 110 as the reduced-capability UE by transmitting a standalone message.

In some implementations, in transmitting the identifier, processor 212 may identify UE 110 as the reduced-capability UE during an initial access procedure.

In some implementations, in transmitting the identifier, processor 212 may transmit the identifier in a MAC CE during a random access procedure (e.g., in Msg3 or Msg5).

Under various proposed schemes in accordance with the present disclosure pertaining to identifying support of a reduced capability in mobile communications, processor 212 of apparatus 210 in a 5GS, implemented in or as UE 110, may transmit, via transceiver 216, to a network (e.g., network 120 via apparatus 220 as network node 125) an identifier that identifies UE 110 as a reduced-capability UE. Additionally, processor 212 may communicate, via transceiver 216, with the network using a reduced capability.

In some implementations, the reduced capability may include one or more of a bandwidth used by UE 110, a number of receiving antennas at UE 110, and a half duplex FDD operation.

In some implementations, in transmitting the identifier, processor 212 may identify the UE as the reduced-capability UE by transmitting a standalone message.

In some implementations, in transmitting the identifier, processor 212 may identify the UE as the reduced-capability UE during an initial access procedure.

In some implementations, in transmitting the identifier, processor 212 may transmit the identifier in a MAC CE during a random access procedure.

In some implementations, processor 212 may perform additional operations. For instance, processor 212 may receive, via transceiver 216, from the network (e.g., via apparatus 220) an indication of support of the reduced capability.

In some implementations, in receiving the indication, processor 212 may receive from a cell of the network a broadcast indicating support of an operation with the reduced capability by the cell or by a neighboring cell of the network.

In some implementations, in receiving the indication, processor 212 may receive from the network a broadcast indicating support of an operation with the reduced capability at a frequency by one or more cells of the network.

Illustrative Processes

Figure 3:
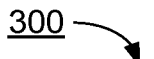
FIG. 3 is a flowchart of an example process in accordance with an implementation of the present disclosure.

FIG. 3 illustrates an example process 300 in accordance with an implementation of the present disclosure. Process 300 may represent an aspect of implementing various proposed designs, concepts, schemes, systems and methods described above, whether partially or entirely, including those pertaining to those described above. More specifically, process 300 may represent an aspect of the proposed concepts and schemes pertaining to identifying support of a reduced capability in mobile communications. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a communication entity such as a network node or base station (e.g., network node 125) of a wireless network (e.g., wireless network 120). Process 300 may begin at block 310.

At 310, process 300 may involve processor 212 of apparatus 210 receiving, via transceiver 316, from a network (e.g., from network 120 via apparatus 220 as network node 125) an indication of support of a reduced capability. Process 300 may proceed from 310 to 320.

At 320, process 300 may involve processor 212 communicating, via transceiver 316, with the network (e.g., via apparatus 220) using the reduced capability.

In some implementations, in receiving the indication, process 300 may involve processor 212 receiving from a cell of the network a broadcast indicating support of an operation with the reduced capability by the cell. In such cases, in receiving the broadcast, process 300 may involve processor 212 receiving the indication in a SIB in the broadcast.

In some implementations, in receiving the indication, process 300 may involve processor 212 receiving from the network a broadcast indicating support of an operation with the reduced capability at a frequency by one or more cells of the network. In such cases, in receiving the broadcast, process 300 may involve processor 212 receiving the indication in a SIB1 in the broadcast.

In some implementations, in receiving the indication, process 300 may involve processor 212 receiving from a cell of the network a broadcast indicating support of an operation with the reduced capability by a neighboring cell of the network. In such cases, in receiving the broadcast, process 300 may involve processor 212 receiving the indication in a SIB3 or a SIB4 in the broadcast.

In some implementations, the reduced capability may include one or more of a bandwidth used by UE 110, a number of receiving antennas at UE 110, and a half duplex FDD operation.

In some implementations, process 300 may involve processor 212 performing additional operations. For instance, process 300 may involve processor 212 transmitting, via transceiver 316, to the network (e.g., via apparatus 220) an identifier that identifies UE 110 as a reduced-capability UE.

In some implementations, in transmitting the identifier, process 300 may involve processor 212 identifying UE 110 as the reduced-capability UE by transmitting a standalone message.

In some implementations, in transmitting the identifier, process 300 may involve processor 212 identifying UE 110 as the reduced-capability UE during an initial access procedure.

In some implementations, in transmitting the identifier, process 300 may involve processor 212 transmitting the identifier in a MAC CE during a random access procedure (e.g., in Msg3 or Msg5).

Figure 4:
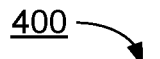
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above, whether partially or entirely, including those pertaining to those described above. More specifically, process 400 may represent an aspect of the proposed concepts and schemes pertaining to identifying support of a reduced capability in mobile communications. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively.

Process 400 may be implemented by or in apparatus 210 and apparatus 220 as well as any variations thereof. Solely for illustrative purposes and without limiting the scope, process 400 is described below in the context of apparatus 210 as a UE (e.g., UE 110) and apparatus 220 as a communication entity such as a network node or base station (e.g., network node 125) of a wireless network (e.g., wireless network 120). Process 400 may begin at block 410.

At 410, process 400 may involve processor 212 of apparatus 210 transmitting, via transceiver 216, to a network (e.g., network 120 via apparatus 220 as network node 125) an identifier that identifies UE 110 as a reduced-capability UE. Process 400 may proceed from 410 to 420.

At 420, process 400 may involve processor 212 communicating, via transceiver 216, with the network using a reduced capability.

In some implementations, the reduced capability may include one or more of a bandwidth used by UE 110, a number of receiving antennas at UE 110, and a half duplex FDD operation.

In some implementations, in transmitting the identifier, process 400 may involve processor 212 identifying the UE as the reduced-capability UE by transmitting a standalone message.

In some implementations, in transmitting the identifier, process 400 may involve processor 212 identifying the UE as the reduced-capability UE during an initial access procedure.

In some implementations, in transmitting the identifier, process 400 may involve processor 212 transmitting the identifier in a MAC CE during a random access procedure.

In some implementations, process 400 may involve processor 212 performing additional operations. For instance, process 400 may involve processor 212 receiving, via transceiver 216, from the network (e.g., via apparatus 220) an indication of support of the reduced capability.

In some implementations, in receiving the indication, process 400 may involve processor 212 receiving from a cell of the network a broadcast indicating support of an operation with the reduced capability by the cell or by a neighboring cell of the network.

In some implementations, in receiving the indication, process 400 may involve processor 212 receiving from the network a broadcast indicating support of an operation with the reduced capability at a frequency by one or more cells of the network.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A method, comprising:

receiving, by a user equipment (UE), from a network an indication of support of a reduced capability; and communicating, by the UE, with the network using the reduced capability, wherein the receiving of the indication comprises;

receiving, from a cell of the network, a System Information Block 1 (SIB1) including a field which indicates support of an operation with the reduced capability by the cell; and receiving, from the cell of the network, the indication in a System Information Block 4 (SIB4) of support of the operation with the reduced capability by a neighboring cell of the network, and wherein the reduced capability comprises one or more of:

the UE communicating with a reduced operating bandwidth, the UE supporting a reduced number of antennas, and the UE operating with a half-duplex instead of a full-duplex in a frequency-division duplexing (FDD) operation.

2. The method of claim 1, wherein the receiving of the indication further comprises receiving from the network a broadcast indicating support of an operation with the reduced capability at a frequency by one or more cells of the network.

3. The method of claim 2, wherein the receiving of the broadcast comprises receiving the indication in the SIB1 in the broadcast.

4. The method of claim 1, wherein the reduced operating bandwidth is 20 MHz, and wherein the reduced number of antennas is 1 or 2.

5. The method of claim 1, further comprising:

transmitting to the network an identifier that identifies the UE as a reduced-capability UE.

6. The method of claim 5, wherein the transmitting of the identifier comprises identifying the UE as the reduced-capability UE by transmitting a standalone message.

7. The method of claim 5, wherein the transmitting of the identifier comprises identifying the UE as the reduced-capability UE during an initial access procedure.

8. The method of claim 5, wherein the transmitting of the identifier comprises transmitting the identifier in a medium access control (MAC) control element (CE) during a random access procedure.

9. A method, comprising:

transmitting to a network an identifier that identifies a user equipment (UE) as a reduced-capability UE;

receiving from the network an indication of support of a reduced capability; and communicating with the network using the reduced capability, wherein the receiving of the indication comprises;

receiving, from a cell of the network, a System Information Block 1 (SIB1) including a field which indicates support of an operation with the reduced capability by the cell; and receiving, from the cell of the network, the indication in a System Information Block 4 (SIB4) of support of the operation with the reduced capability by a neighboring cell of the network, and wherein the reduced capability comprises one or more of:

the UE communicating with a reduced operating bandwidth, the UE supporting a reduced number of antennas, and the UE operating with a half-duplex instead of a full-duplex in a frequency-division duplexing (FDD) operation.

10. The method of claim 9, wherein the reduced operating bandwidth is 20 MHz, and wherein the reduced number of antennas is 1 or 2.

11. The method of claim 9, wherein the transmitting of the identifier comprises identifying the UE as the reduced-capability UE by transmitting a standalone message.

12. The method of claim 9, wherein the transmitting of the identifier comprises identifying the UE as the reduced-capability UE during an initial access procedure.

13. The method of claim 9, wherein the transmitting of the identifier comprises transmitting the identifier in a medium access control (MAC) control element (CE) during a random access procedure.

14. The method of claim 9, wherein the receiving of the indication further comprises receiving from a cell of the network a broadcast indicating support of an operation with the reduced capability by the cell.

15. The method of claim 9, wherein the receiving of the indication further comprises receiving from the network a broadcast indicating support of an operation with the reduced capability at a frequency by one or more cells of the network.

* * * * *